(12) United States Patent
Dean et al.

(10) Patent No.: US 10,380,273 B2
(45) Date of Patent: Aug. 13, 2019

(54) SYSTEM AND METHOD FOR TESTING THE VALIDITY OF BIM-DESIGNED ELECTRICAL WIRING PATHWAYS

(71) Applicant: M.C. DEAN INC., Dulles, VA (US)

(72) Inventors: William H. Dean, Miami Beach, FL (US); Alexey Karshakevich, Toronto (CA); Oleksandr Tomkeiev, Reston, VA (US)

(73) Assignee: M.C. DEAN INC., Tysons, VA (US)

( * ) Notice: Subject to any disclaimer, the term of this patent is extended or adjusted under 35 U.S.C. 154(b) by 683 days.

(21) Appl. No.: 15/087,080

(22) Filed: Mar. 31, 2016

(65) Prior Publication Data

US 2017/0286568 A1    Oct. 5, 2017

(51) Int. Cl.
  *G06F 17/50*    (2006.01)
(52) U.S. Cl.
  CPC ................ *G06F 17/5004* (2013.01)
(58) Field of Classification Search
  CPC .................................................. G06F 17/5004
  USPC ............................................................ 703/18
  See application file for complete search history.

(56) References Cited

U.S. PATENT DOCUMENTS

| | | | | |
|---|---|---|---|---|
| 6,999,907 | B2 * | 2/2006 | Smith | G06F 17/5004 703/1 |
| 7,676,348 | B2 | 3/2010 | Okada | |
| 8,738,332 | B2 | 5/2014 | Stebnicki et al. | |
| 8,762,877 | B2 | 6/2014 | Loberg et al. | |
| 8,935,646 | B2 | 1/2015 | Whitford et al. | |
| 9,213,785 | B2 * | 12/2015 | Plewe | G06F 17/5004 |
| 2008/0275674 | A1 * | 11/2008 | Reghetti | G06F 17/5004 703/1 |
| 2011/0153524 | A1 | 6/2011 | Schnackel | |
| 2011/0307223 | A1 | 12/2011 | Khalil | |
| 2018/0120793 | A1 * | 5/2018 | Tiwari | G06Q 10/04 |

OTHER PUBLICATIONS

N. Shariatzadeh et. al., Software Evaluation Criteria for Rapid Factory Layout Planning, Design and Simulation, Procedia CIRP 3 (2012) 299-304. (Year: 2012).*

* cited by examiner

*Primary Examiner* — Rehana Perveen
*Assistant Examiner* — Justin C Mikowski
(74) *Attorney, Agent, or Firm* — Roberts Mlotkowski Safran Cole & Calderon, P.C.

(57) ABSTRACT

A testing system and method are provided for verifying that a BIM-designed electrical distribution system in a building provides a valid, cost-effective electrical wiring pathway between every device and its assigned electrical distribution source. The system includes a digital processor having access to the informational content of the BIM-designed electrical distribution system, and a user interface and display screen connected to the digital processor. In operation, the digital processor extracts from the BIM-designed electrical distribution system the x-y locations of the devices, distribution sources such as electrical supply panels, and wiring pathway elements (e.g. conduits, junction boxes, etc.) forming electrical pathways. As the user lays out the pathways, the processor immediately informs the user, via the display screen, whether the distances between the device and the nearest exit point of the associated pathway and the distribution source and the nearest entry point of the associated pathway are within pre-selected, empirically-determined tolerances.

18 Claims, 13 Drawing Sheets

FIG. 3

System Monitor - 01 - LEVEL 01 - Overhead

1. Device Connection Status (see Flowchart)

Loads (from Engineering Design Model) | Pathways (from Physical Design Model)

The view (slice of building) being validated

| Device Mark | Device Family | Device Room | Panel | Circuit | Supply Type | Supply Room | Pathway to Device | Pathway Status | Panel to Pathway |
|---|---|---|---|---|---|---|---|---|---|
|  | A-Duplex_Rec... | 1105 | RP211 | 1 | Junction Box | 1105 | 6' 6" | OK |  |
|  | A-Recep_Pow... | 1105 | LAB211 | 41,43 | Junction Box | 1105 | 6' 6" | PNL Nearby | 7' 8" |
| FP-12659 | A-Duplex_Rec... | 1157 | RP212 | 9 | Junction Box | 1157 | 6' 6" | PNL Nearby | 6' 7" |
|  | A-Recep_Pow... | 1105 | ELAB212 | 15,17 | Junction Box | 1105 | 6' 6" | PNL Nearby | 4' 2" |
|  | ELECTRICAL... | C101 | LP411 | 4 | Junction Box | 1105 | 6' 7" | OK |  |
| FP-7175 | A-Duplex_Rec... | C101 | RP212 | 19 | Junction Box | 1105 | 6' 7" | OK |  |
| FP-51 | A-Double_Dup... |  | ELIT211 | 19 | Junction Box | TE01 | 6' 7" | OK |  |
|  | ELECTRICAL... | C101 | LP411 | 10 | Junction Box | 1105 | 6' 7" | OK |  |
|  | ELECTRICAL... | C101 | LP411 | 9 | Junction Box | 1105 | 6' 7" | OK |  |
|  | ELECTRICAL... | C101 | LP411 | 5 | Junction Box | 1105 | 6' 7" | PNL Not Reac... | 58' 3" |
| FP-5714 | A-Motor-480V... | C101 | Q411 | 10 | Junction Box | 1105 | 4' 11" | PNL Nearby | 5' 10" |
| FP-6587 | A-Raceway_D... | 1105 | ELAB213 | 22 | Junction Box | 1105 | 6' 8" | PNL Nearby | 4' 12" |
|  | ELECTRICAL... | C101 | LP411 | 3 | Junction Box | 1105 | 6' 8" | OK |  |
|  | A-Raceway_D... | 1105 | LAB212 | 2 | Junction Box | 1105 | 6' 8" | PNL Nearby | 4' 9" |
|  | ELECTRICAL... | C103 | ELLP411 | 14 | Junction Box | C103 | 6' 8" | PNL Not Reac... | 12' 4" |

Column headers: 2. Reference ID (If present) | 3. Device Type | 4. Device Location | 5. Powered by Panel | 6. Circuit Numbers | 7. Pathway Connection Type | 8. Pathway Location | 9. Distance from Device | 10. 11. Panel Connection Status | 12. Distance to Panel Report | Log Show Device | Show Supply | Show Panel | Isolate Circuit | Export | Add Circuits to Element Refresh | Pick from Current Model | Close

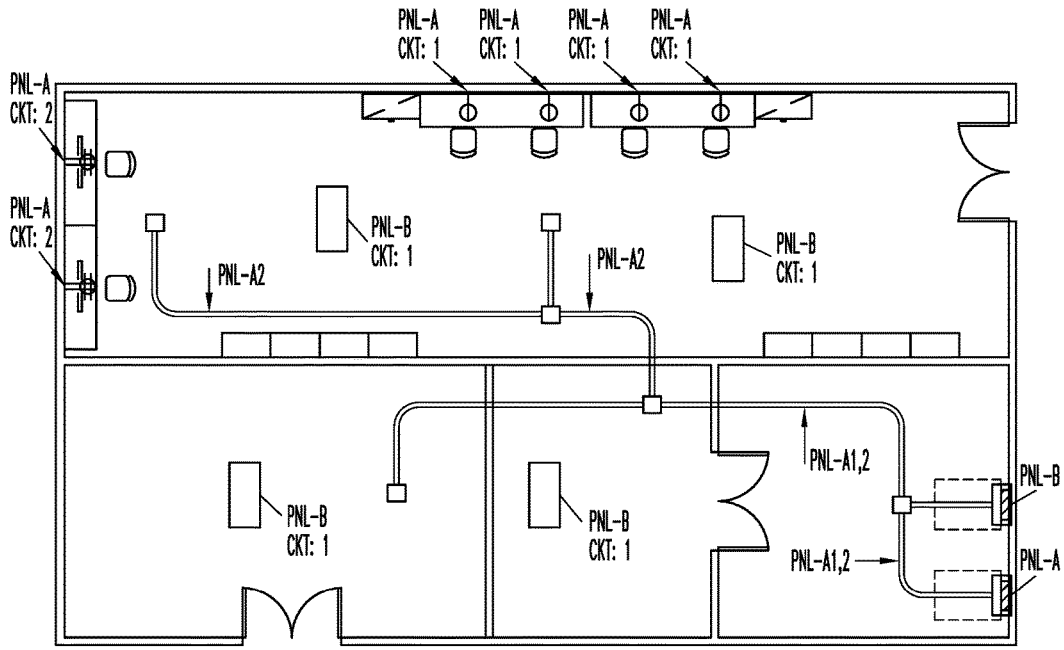
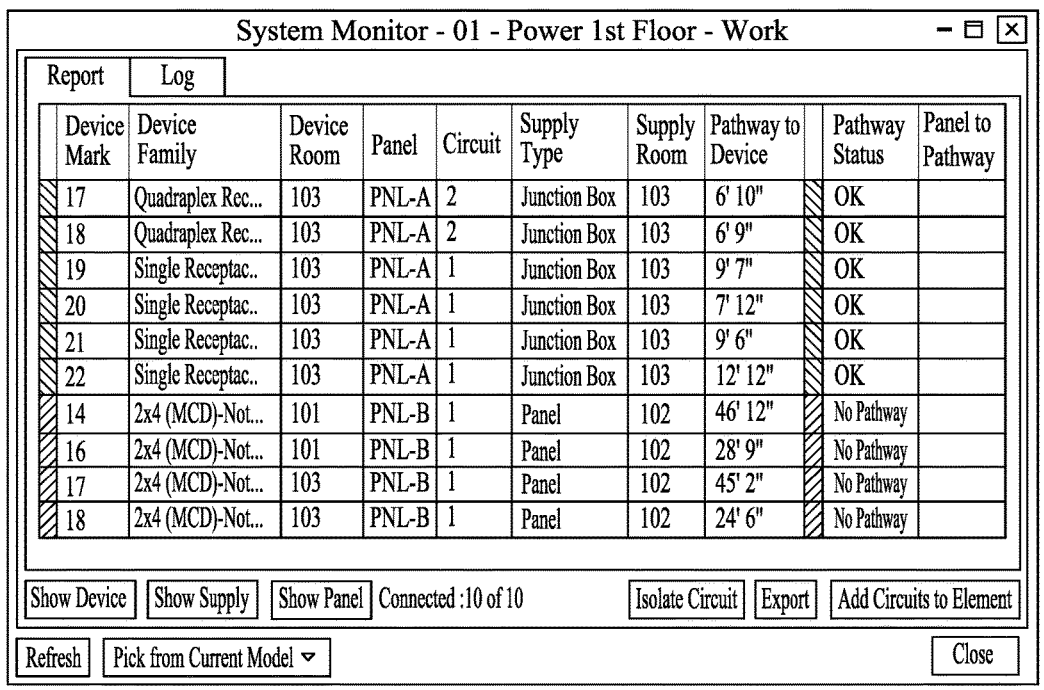
FIG. 8

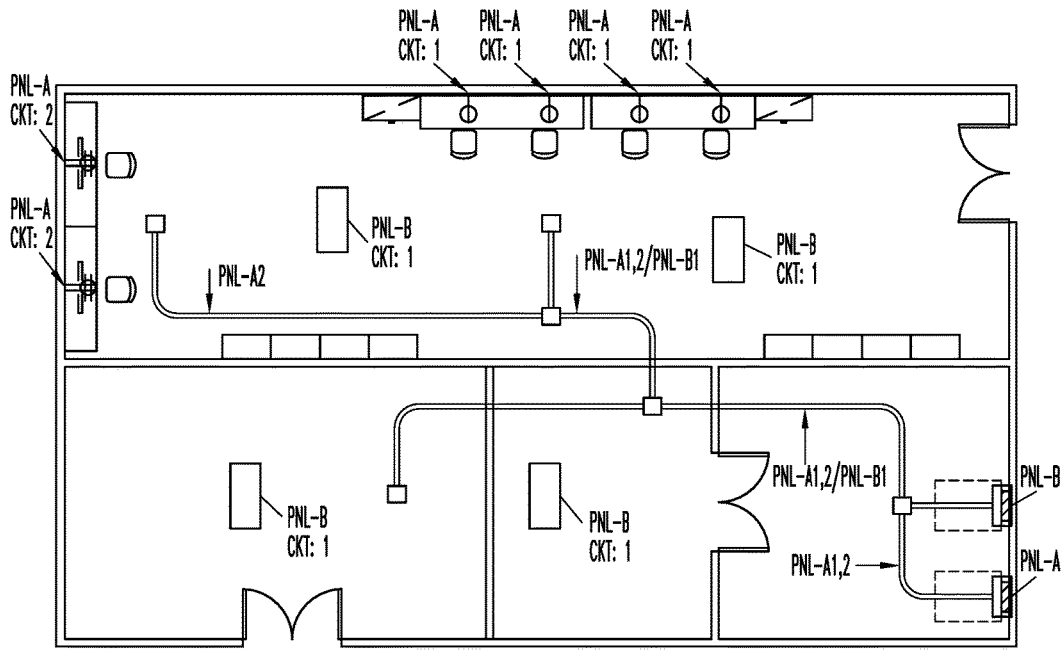
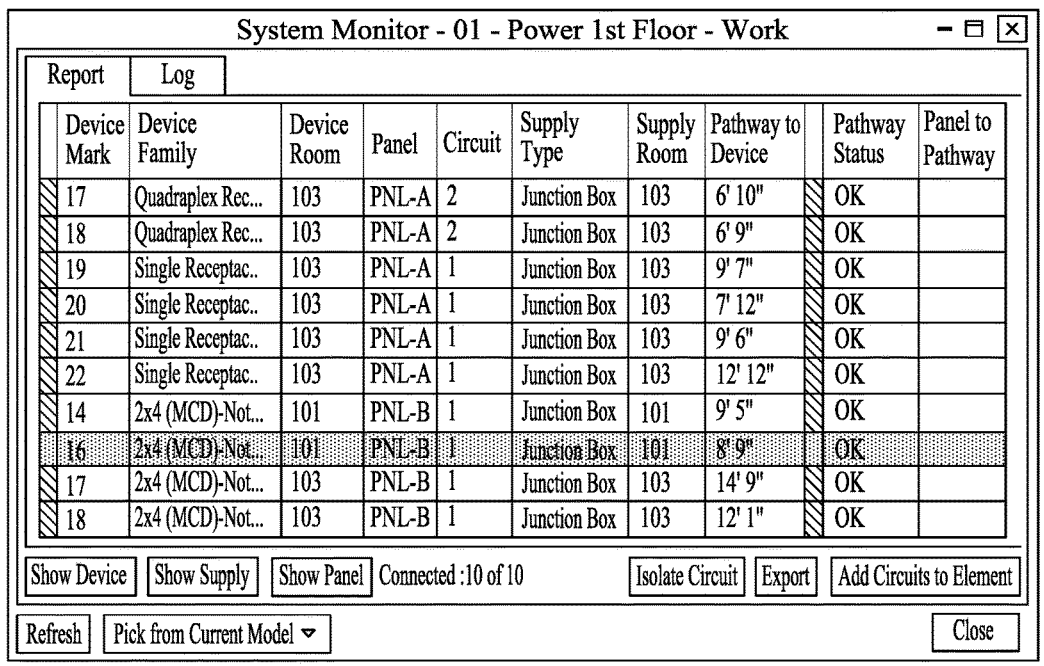
FIG. 9

| | |
|---|---|
| | Conduit with Fittings<br>Power (Normal LV 120/208V - EMT |

| Conduits (1) | | Edit Type |
|---|---|---|

Constraints ation ish

Data

| CND | Run Number | 010 |
|---|---|---|
| CND | Conduit From | ELEC. ROOM |
| CND | Conduit To | LAB |
| CND | Wire Circuits | PNL-A 2 |
| CND | Wire Number | 3 |
| CND | Ground Wire Size | |
| CND | Phase Wire Size | |
| CND | WBS | |
| CND | To Be Spooled | ☐ |
| CND | Run Complete | ☐ |
| CND | Neutral Size | |

FIG. 10A

SYSTEM AND METHOD FOR TESTING THE VALIDITY OF BIM-DESIGNED ELECTRICAL WIRING PATHWAYS

FIELD

This invention generally relates to electrical distribution systems designed by building information modeling (BIM) tools, and is specifically concerned with a system and method for testing the validity of electrical wiring pathways in such distribution systems.

BACKGROUND

Building information modeling (BIM) tools are frequently used by building designers to design the layout of the electrical and signal distribution systems of the building. Such systems include the power distribution system of the building, which in turn is comprised of devices (e.g. power outlets, light fixtures, ventilation fan motors, etc.), power supply panels, circuits between the devices and the panels, and the electrical pathway elements that carry the circuits (e.g. conduits, junction boxes, metal-clad (MC) cables, etc.). Such systems also include control and signal distribution systems, which again are comprised of devices (e.g. fire alarm sensors, security cameras, control actuators, etc.), distribution sources (e.g. control panels, patch panels), circuits between the devices and the sources, and pathway elements that carry the circuits. In using such a BIM tool, the modeler selects the locations of the various devices on the floor plan of the building, as well as the locations of the distribution sources that supply the devices with electrical power or signals. The modeler then assigns a circuit of one of the sources to each of the devices. Finally, the modeler selects the locations of a string of pathway elements between each device and its associated source that provides an electrical wiring pathway between the device and its assigned circuit. The BIM tool records the x-y-z locations of the devices and the distribution sources, the x-y-z locations of the strings of pathway elements, and the identity of the distribution source and circuit assigned to each device.

SUMMARY

Unfortunately, as useful as BIM tools are, their use rarely results in a completely error-free design. Sometimes the modeler neglects to provide an electrical pathway between one or more devices and an electrical supply panel. Other times, the pathway violates parameters set by the building owner. For example, many building owners limit the length of MC cable that may be used in an electrical or signal wiring pathway, and the BIM-designed pathway may require a length of MC cable in excess of such limitation. Finally, the applicant has observed instances where the pathway is impractical or excessively expensive to build in the field. Such errors can arise from a number of causes, including modeler errors in assigning a proper string of pathway elements between the devices and their assigned circuits, or modeler oversights after changes are made, such as when new devices are added or the location of one or more devices is changed. The ever-increasing number and density of wiring pathways in modern buildings such as hospitals and data centers increases the probability of such errors occurring in the future, as it becomes ever more difficult for the modeler to perceive such errors in the detail-laden floor plans.

These design errors often necessitate the installation of additional pathway elements, or the replacement of such elements. Worse yet, such design errors are typically not discovered until after the construction of walls, ceilings, and other structures which obstruct the installation of the additional conduits, junction boxes and/or metal-clad (MC) cables required to correct the error. The time and expense associated with the installation of the additional conduits, junction boxes and metal-clad (MC) cables necessary to correct the errors is often substantial, sometimes costing hundreds of thousands of dollars.

The invention is a testing system for verifying that a BIM-designed electrical distribution network provides a valid electrical pathway between each electrical device and one of the distribution sources, which is typically one of the electrical supply panels of the building. As used herein, a "valid" electrical wiring pathway is one that avoids the three aforementioned design errors and provides a cost-effective combination of pathway elements (e.g. conduits, junction boxes, conduit stubs, MC cables, etc.) that does not violate either building owner requirements or applicable electrical codes. The inventive testing system is preferably used in combination with a BIM tool, such as Autodesk® Revit, that provides the layout of an electrical distribution system on a building floor plan, including the specific x-y-z locations on the floor plan of the devices, the distribution sources, and all of the wiring pathway elements specified by the modeler, as well as the identity of both the distribution source and the circuit assigned to each device.

The testing system generally comprises a digital processor with a user interface that includes a visual display screen. The digital processor initially extracts, from the x-y-z information recorded by the BIM tool, the x-y locations on the building floor plan of the devices of the building (e.g. lighting fixtures, electrical outlets, ventilator fans, fire alarm sensors, security cameras etc.), the x-y locations of the electrical supply panels and other distribution sources, and the x-y locations of any pathway elements specified by the modeler, including in particular, for each pathway for which a circuit has been assigned, the x-y locations of the exit and entry points of pathways defined by the pathway elements. The system then uses this information to compute the shortest x-y distances between each device and the exit points on the pathways that are assigned to the device's circuit, and the shortest x-y distances between entrance points on the pathways and the distribution source assigned to the device. The system then compares these two x-y distances to pre-selected, empirically determined distances $\varepsilon 1$ and $\varepsilon 2$, wherein $\varepsilon 1$ and $\varepsilon 2$ are indicative of a valid wiring pathway. If one or both of these shortest x-y distances equals or exceeds $\varepsilon 1$ or $\varepsilon 2$, the system then provides a visual signal on the display screen that the pathway is invalid. While the system could extract x-y-z location information from the BIM tool and compute x-y-z distances instead of the aforementioned x-y distances, the extraction and computation of only x-y distances has been found in practice to provide acceptable margins of error while advantageously simplifying the software necessary to implement the system.

In the preferred embodiment, $\varepsilon 1$ and $\varepsilon 2$ are distances empirically selected on the basis of a combination of field experience, building owner requirements, and applicable electrical and signaling wiring codes. In the preferred embodiment, in a case where the system is applied to a power distribution system, the distance $\varepsilon 1$ is selected to be a distance of 10 feet. This distance corresponds both to the standard length that electrical conduit is manufactured in, as well as the maximum length—via applicable wiring codes— that electrical conduit that can be installed in a building without the need for mechanical support. Accordingly, if the distance between an entry point on an electrical pathway and its associated electrical panel is 10 feet or less, such a gap may be bridged by the on-site construction electrician fairly quickly and easily via a single piece of conduit without the need for providing mechanical support (e.g. ceiling-mounted clamps, support plates, etc.) in the vicinity of the panel. Ease of installation is a particularly important consideration at the panel-end of the pathway due to space constraints caused by the surrounding utility closet and the need to align such a connecting conduit within the dense convergence of other conduits and/or MC cables around the panel. By contrast, $\epsilon2$—which is the permissible distance between a device and the nearest entry point of its corresponding pathway—, may be substantially longer than $\epsilon1$. The reason for this is that the more spacious environment at the device-end of the pathway makes it fairly easy for the on-site construction electrician to bridge a longer gap. Accordingly, in the preferred embodiment, the distance $\epsilon2$ is selected to be a distance of 20 feet. Such a distance is often within the limit of MC cable allowed by building owners, and even if it were not, the installation of two standard lengths of conduit in an open area would still not be excessively difficult or expensive, despite the need for the installation of mechanical support for the conduit. The distance $\epsilon2$ also corresponds to the permissible distance between a device and its associated panel in a case where no pathway has been provided. This follows from the applicant's observation that the installation of a pathway by the on-site electrician between a device and a panel that is shorter than two standard lengths of conduit and that does not have to be aligned with the conduits converging into the panel is no more difficult than the installation of a pathway between a device and a pathway exit point that is shorter than two standard lengths of conduit. Of course the distances $\epsilon1$ and $\epsilon2$ may vary in accordance with the specific electrical distribution system being installed, local building conditions and applicable owner and code constraints.

The processor may initially execute the step of confirming whether the BIM-designed electrical and signal distribution system has assigned each device to a circuit of one of the distribution sources, and for any such unassigned device, inform the user of the testing system via the visual display of the unassigned condition of the device. This step prompts the correction of errors resulting from the BIM modeler's failure to assign such a circuit to each device. This step has the added benefit of helping to insure that the proper circuit is assigned to the device.

The processor may further execute the step of determining, for each device for which the BIM-designed electrical distribution system has assigned a circuit, whether there is a junction box or conduit stub (i.e. a pathway exit point) associated with the circuit assigned to the device, and if not, if the x-y distance between the device and its assigned distribution source is equal to or greater than a preselected distance $\epsilon2$. If the x-y distance is less than $\epsilon2$, then the visual display will indicate that a valid pathway is present, since an on-site construction electrician can bridge such a gap fairly easily for all the previously-given reasons. However, if the distance is equal to or greater than $\epsilon2$, the processor then informs the user via the visual display that no valid pathway exists between the device and its assigned panel.

After the digital processor determines the closest exit point of the pathway to the device, it may determine the closest entry point of the pathway to the distribution source associated with the device by tracing backwards from the exit point from the first to the last connected element of the pathway. Preferably, the digital processor implements this step by determining the x-y distance between each entry point of each pathway element and the distribution source associated with the device, and then selecting the closest entry point to the panel. If the x-y distance is less than $\epsilon1$, then the visual display will indicate that a valid pathway is present, since an on-site construction electrician can bridge such a gap fairly easily for all the previously-given reasons. However, if the distance is equal to or greater than $\epsilon1$, the processor then informs the user via the visual display that no valid pathway exists between the device and its assigned panel.

In a preferred mode of operation, the valid/invalid status of the pathway formed by the elements assigned by the system is displayed simultaneously with the floor plan sector being checked while the user adds strings of pathway elements to the BIM design and assigns them to particular circuits. Because the processor automatically runs the aforementioned programming steps each time the user assigns pathway elements to circuits in the BIM design, the display screen of the system reliably provides real-time, immediate feedback as to the validity or invalidity of the resulting pathways. Such immediate feedback prompts the user to immediately correct invalid pathways at the same time they are being designed, thereby substantially reducing the chance that an invalid pathway will remain in the final design due to oversight.

Also, because the pathways are not laid out until circuits have been assigned to the devices, the system of the invention has the added advantage of insuring that not only the pathways are valid, but that the circuiting between the devices and their respective sources is valid also.

While the examples of the invention provided in this application concern power distribution systems comprising devices (e.g. power outlets, light fixtures, ventilation fan motors, etc.), power supply panels, circuits between the devices and the panels, and the electrical pathway elements that carry the circuits (e.g. conduits, junction boxes, metal-clad (MC) cables, etc.), the term "electrical distribution systems" as used herein includes not only all other electrical power distribution systems that may be present in the building, such as the power systems between large pieces of electrical equipment (e.g. feeds to distribution panels) and specialty electrical systems such as fire alarms, but also electrical signal distribution systems, which include telecommunications systems such as computer or IP phone networks, and security systems such as video surveillance systems. The term "device" may include any electrical load or any device that receives electrical signals. The term "distribution source" may include a source of electrical power such as an electrical power panel or a source of electrical signals. The term "pathway element" may include not only junction boxes, conduits and MC cables, but cable trays as well.

BRIEF DESCRIPTION OF THE DRAWINGS

FIG. 3 illustrates an example of the report displayed on the visual display screen of the system shown in FIG. 1 after the digital processor completes the steps of the flowchart illustrated in FIGS. 2A and 2B;

FIG. 8 illustrates how the system user positions additional junction boxes and conduits to form pathways between more of the devices and their assigned distribution sources, and the simultaneous display of a system report of the validity of the resulting pathways;

FIG. 9 illustrates how the system user completes valid pathways between the remaining devices and their assigned distribution sources, and the simultaneous display of a system report clearly showing, via color-coding, the valid status of the pathways;

FIG. 10A illustrates how the system allows the system user to build a table listing the assignments between pathway elements entered into the BIM-designed electrical system and specific panel circuits.

DETAILED DESCRIPTION OF A PREFERRED EMBODIMENT

Figure 1:
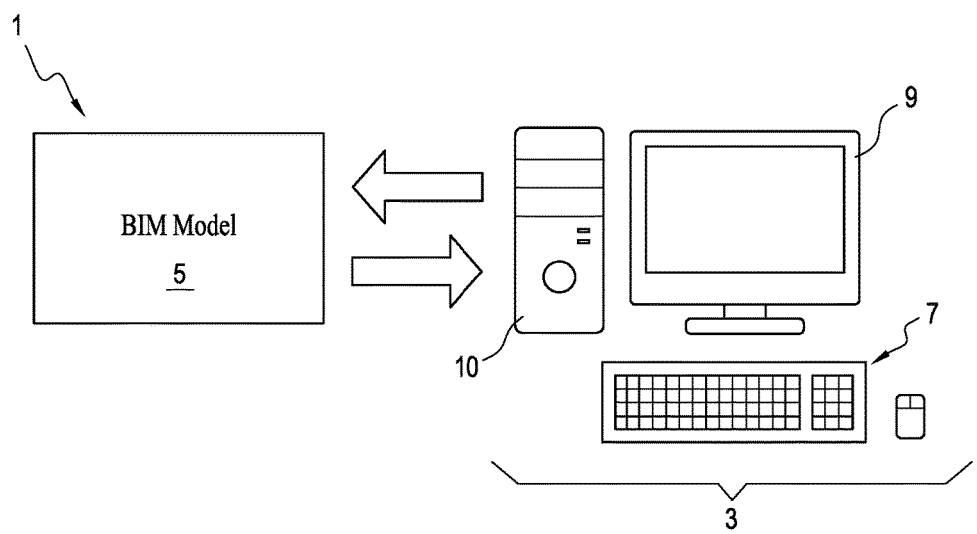
FIG. 1 is a block diagram of the computer components and BIM modeling tool that form the structure of the system.

With reference to FIG. 1, the testing system 1 generally comprises a digital processor 3 that is electrically or optically connected to or otherwise in communication with a BIM modeling tool 5. The processor 3 includes a user interface 7 in the form of a keyboard and mouse combination, a display screen 9, and a processing unit 10 which may be any one of a number of commercially-available computer processors. In the preferred embodiment, the BIM modeling tool is Autodesk® Revit, although any one of a number of commercially available BIM modeling tools may form part of the system 1 of the invention.

In contrast to prior art BIM tools, the system 1 automatically and simultaneously displays a real-time report on the display screen 9 clearly indicating the validity or invalidity of the resulting pathway as soon as a system user assigns a circuit to a pathway. The manner in which the system 1 accomplishes this task is summarized in FIGS. 2A and 2B which comprise a flowchart 20 summarizing the operation of the digital processor of the system 1 of the invention in executing a pathway validation program.

Figure 2A:
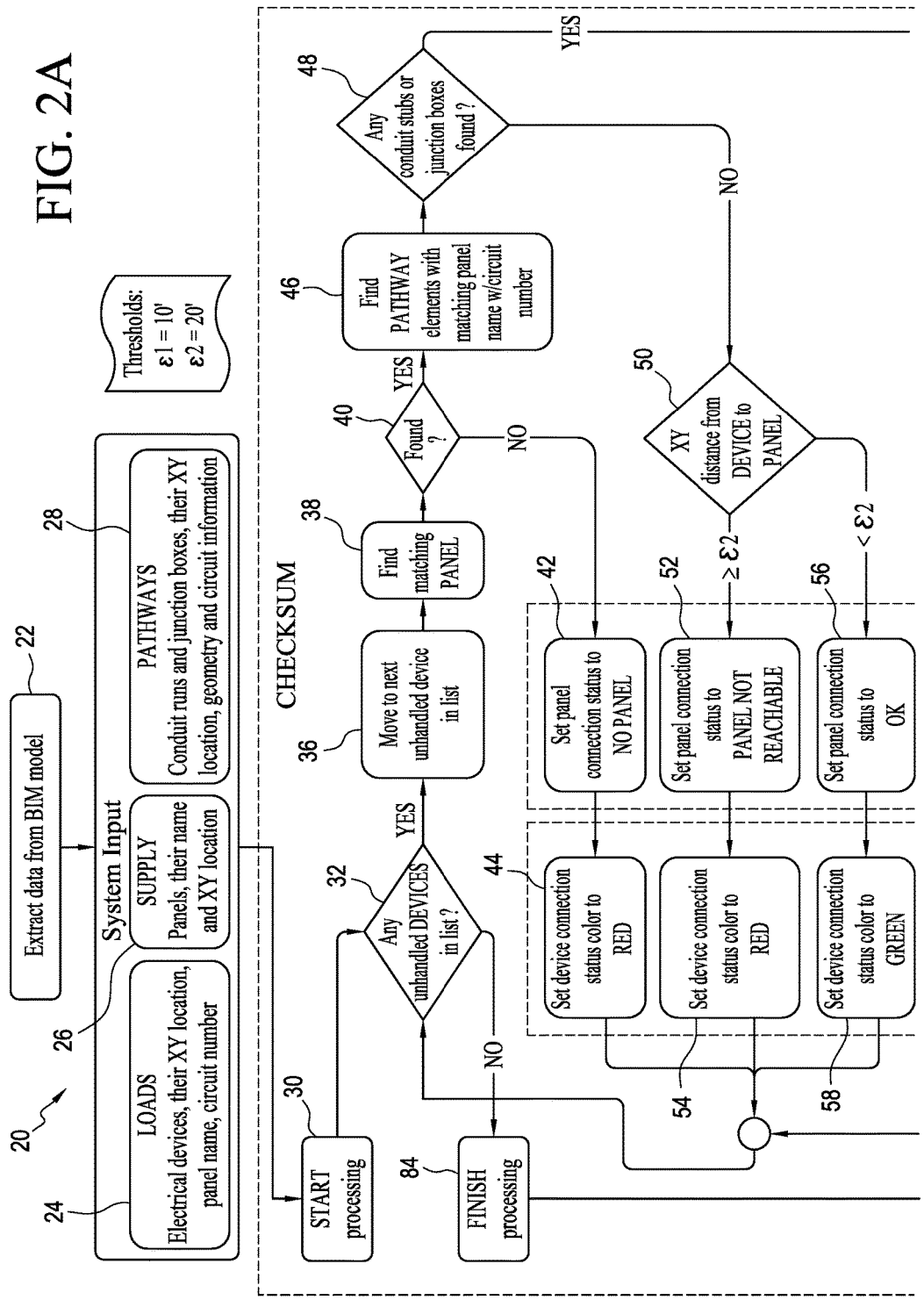
FIGS. 2A and 2B are a flowchart summarizing the validation program that is periodically run by the digital processor shown in FIG. 1.

With reference in particular to FIG. 2A, in the first step 22 of this flowchart, the digital processor 3 selectively extracts data compiled by the BIM tool used to model the electrical distribution system of a building. Conventional BIM tools, such as Autodesk® Revit, determine and record the identity and three-dimensional (x-y-z) locations of each of the devices, each of the distribution sources such as electrical supply panels, and any pathway elements with respect to the floor plans of the building. Such conventional BIM tools also record the specific panels and circuits assigned by the modeler to each of the devices. As illustrated in boxes 24, 26, and 28, the system 1 extracts the identity and two-dimensional (x-y) locations of each of the devices, each of the distribution sources, and any pathway elements with respect to the floor plan sector of the building being viewed on the display screen 9, as well as the specific panels and circuits assigned by the modeler to each of the devices. While the system could extract x-y-z location information from the BIM tool and compute x-y-z distances instead of the aforementioned x-y distances, the extraction and computation of only x-y distances has been found in practice to provide acceptable margins of error while advantageously simplifying the software and reducing the processing power necessary to implement the system 1.

The digital processor 3 starts processing at step 30 after completion of the data input steps 24, 26, and 28 by asking, in question box 32, whether there are any "unhandled" devices (i.e. devices that have not been processed through at least process steps 36-44 of the flowchart 20). In implementing this step, the processor 3 forms a list of all of the devices designated on the floor plan being checked, and sequentially applies question block 32 to each device. If the answer is "No" then all of the devices have been processed through at least steps 36-44, and the flowchart 20 proceeds to the "finish processing" block 84 and proceeds to display a report on the status of the pathways (as shown in FIG. 3) for all of the devices via reporting block 86. However, if the answer to question block 32 is "yes", the processor 3 advances to block 36 in order to commence the pathway-testing procedure on the device. In the initial step of this procedure, the processor 3 in block 38 sifts through the data extracted in step 24 to identify the specific distribution source assigned to the device, and asks in question block 40 whether a specific distribution source has been associated with the device being processed. If the BIM tool modeler has neglected to assign any distribution source or circuit to a particular device, the answer to question block will be "no" and the processor 3 will proceed to blocks 42 and 44, instructing the display screen 9 to indicate a "NO PANEL" connection status to the device in the validation report, accompanied by RED color coding to underscore the invalid connection status of the device. The display of a "NO PANEL" connection status will of course prompt the system user to review the specific input requirements of the device in question and to choose a panel and circuit capable of supplying these requirements. In this manner, the system 1 helps insure that not only the pathways between the devices and sources are valid, but that the circuiting is valid as well. However, if the modeler has used the BIM tool correctly, or if the system user has corrected the "NO PANEL" condition, the answer to question block 40 will be "yes", and the processor 3 will proceed to block 46.

In block 46, the processor 3 identifies the pathway elements that the modeler or system user has assigned to the particular circuit associated with the device being processed. In the preferred embodiment, the electrical distribution system being tested is a power system, and the pathway elements may include conduits, junction boxes, conduit stubs, and MC cables. However, the electrical distribution system may also be, for example, a computer network, where the pathway elements may additionally include cable trays for supporting communication cables, and busways for supporting power cables. After the processor 3 identifies the pathway elements associated with the particular circuit assigned to the device, it asks in question block 48 whether there are any available exit points on the pathway formed by the elements. In the case of an electrical power distribution system, such exit points typically include junction boxes or conduit stubs, but may also include the pull boxes that are regularly mounted in relatively long runs of conduit formed from multiple, serially-connected 10-foot lengths of conduit. While the purpose of such pull boxes is to provide multiple points where the on-site construction electrician can pull wires through long conduit runs, they can also function as drop-off points for electrical connections as they provide access to the electrical wires contained within the conduits.

If the processor 3 is unable to find any exit points for the pathway elements assigned to the particular circuit associated with the device being processed, the answer to question block 48 will be "no" and the processor 3 will next proceed to question block 50, and ask whether the x-y distance between the device and the assigned distribution source is less than $\varepsilon 2$, or greater than or equal to $\varepsilon 2$. In case when there are no assigned pathway elements and the device may be connected directly to the distribution source, a larger tolerance can be applied. In the preferred embodiment, the distance $\varepsilon 2$ is selected to be a distance of 20 feet. This distance corresponds both to a multiple of the standard length that electrical conduit is manufactured in and the tolerance at the device end of the pathway, which is applicable here for all of the reasons given previously.

If the answer to question block 50 is that the x-y distance between the device and its associated distribution source is greater than or equal to $\varepsilon 2$ (i.e. greater than or equal to 20 feet in this example), then the processor 3 proceeds to blocks 52 and 54 instructing the display screen 9 to indicate a "PANEL NOT REACHABLE" connection status to the device when the validation report is run via block 84, accompanied by RED color coding to underscore the invalid connection status of the device. If however the answer to question block 50 is that the x-y distance between the device and its associated distribution source is less than $\varepsilon 2$, then the processor 3 proceeds to blocks 56 and 58 instructing the display screen 9 to indicate an "OK" connection status to the device when the validation report is displayed, accompanied by GREEN color coding to underscore the valid connection status of the device.

Figure 2B:
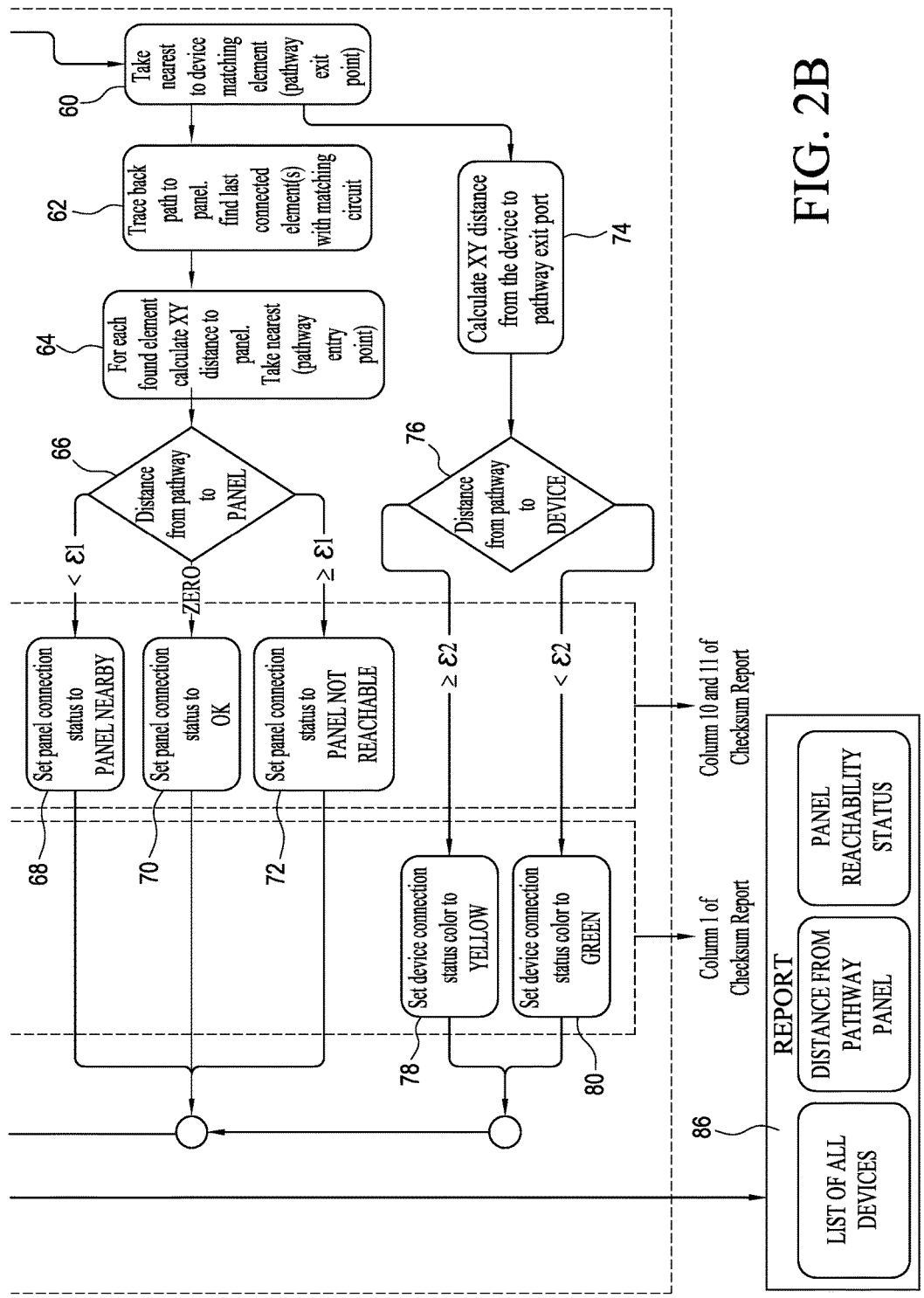

Returning now to previously-discussed question block 48, if the processor 3 succeeds in identifying one or more exit points for the pathway elements in block 46, the answer will be "yes", and the processor 3 will proceed to block 60 illustrated in FIG. 2B.

From block 60, the processor 3 proceeds in parallel through blocks 62-72 and blocks 74-80. In block 60, the processor 3 selects the nearest exit point of the pathway defined by the pathway elements identified in block 46 (i.e. the exit point having the shortest x-y distance between it and the device being processed). Afterwards, the processor 3 sequentially traces backwards through the elements forming the pathway all the way to the last element in the string forming the pathway. As indicated in block 64, for each such pathway element, the processor 3 identifies any entry points on the element, and calculates the x-y distance between all such entry points and the distribution source assigned to the device. The processor 3 then proceeds to question block 66, and asks if the distance between the nearest pathway entry point and the distribution source assigned to the device is less than $\varepsilon 1$, "zero", or greater than or equal to $\varepsilon 1$. If the distance is less than $\varepsilon 1$, then the processor 3 proceeds to block 68 and instructs the display screen 9 to indicate a "PANEL NEARBY" connection status to the device accompanied by a YELLOW color coding, as the on-site construction electrician will have to do some moderate amount of work to complete the pathway. If the distance to the panel is zero (as it would be if the pathway included a conduit directly connected to the panel) then the processor 3 proceeds to block 70 and instructs the display screen 9 to indicate an "OK" connection status to the device accompanied by a GREEN color coding. Finally, if the distance is greater than or equal $\varepsilon 1$, then the processor 3 proceeds to block 72, and instructs the display screen 9 to indicate a "PANEL NOT REACHABLE" connection status to the device along with a RED color coding.

As previously indicated, the processor 3 simultaneously proceeds through blocks 74-80 while processing blocks 62-72. In block 74, the processor 3 calculates the x-y distance from the device to the nearest exit point on the pathway formed from the pathway elements identified in block 46. It then proceeds to question block 76 and asks whether the calculated x-y distance is less than, or greater than or equal to $\varepsilon 2$. $\varepsilon 2$ may be substantially longer than $\varepsilon 1$ since the relatively uncrowded environment at the device-end of the pathway makes it fairly easy for the on-site construction electrician to bridge a longer gap. Accordingly, $\varepsilon 2$ may be twice as long as $\varepsilon 1$ without placing an undue burden on the on-site construction electrician. In the preferred embodiment, the distance $\varepsilon 2$ is selected to be a distance of 20 feet. Such a distance is often within the limit of MC cable allowed by building owners, and even if it were not, the installation of two standard lengths of conduit in an open area would still not be excessively difficult for the electrician, despite the need for the installation of mechanical support for the conduit.

If the answer to question block 76 is that the distance between the device and the nearest exit point on the associated pathway "is greater than or equal to $\varepsilon 2$", then the processor 3 proceeds to block 78, and instructs the display screen 9 to indicate "CONNECTION STATUS YELLOW", as it will be necessary for the on-site construction electrician to conduct a greater-than-average amount of work to complete the pathway. However, if the answer to question block 76 is that the distance between the device and the nearest exit point on the associated pathway "is less than $\varepsilon 2$", then the processor 3 proceeds to block 80, and instructs the display screen 9 to indicate "CONNECTION STATUS GREEN", as the time and work required to complete the pathway falls within expected constraints. After the each of the devices has been "handled" by the application of the flowchart 20, and the answer to question block 32 is "yes", the processor 3 proceeds to block 86 and generates a report listing the connection status of the wiring pathway for each of the devices present in the particular floor plan of the building being validated, FIG. 3 is an example of the type of report generated by the processor 3 in block 86 and displayed on the display screen 9 of the system 1. The first column on the left (i.e. "1. Device Connection Status . . . ") is color-coded entirely GREEN, indicating that the distance between each of the listed devices (e.g. "A-Duplex_Rec[eptacle], A-Double_Rec[eptacle], A-Motor-480V") and the chosen exit point of the corresponding pathway to these devices (i.e. "Junction Box") is less than ε2. This is indeed the case according to column 9 ("Distance From Device"), which displays distances ranging from 4 feet, 11 inches to 6 feet, 8 inches, all of which are considerably less than the ε2 limit of 20 feet. By contrast, the tenth column from the left (i.e. "Panel Connection Status" is color-coded GREEN for devices 1, 5-9 and 13, YELLOW for devices 2-4, 11, 12 and 14, and RED for devices 10 and 15. This portion of the report indicates that the distance between the panel and the nearest entry point for the pathway associated with the device is "0" for devices 1, 5-9 and 13, less than ε1 or 10 feet for devices 2-4, 11, 12 and 14, and greater than ε1 or 10 feet for devices 10 and 15. This is clearly shown to be the case in column 12 labeled "Distance to Panel", which indicates distances between 4 feet, 2 inches and 7 feet, 8 inches for YELLOW-coded devices 2-4, 11, 12 and 14, and distances between 12 feet, 4 inches and 58 feet, 3 inches for RED-coded devices 10 and 15. The color coding allows the user of the system to easily spot the presence of and to determine the specific identity of devices having invalid wiring pathways. It should be noted that columns 5 and 6 display both the panel and the circuit assigned to each of the devices listed in column 3, which helps ensure that each of the listed devices has been properly circuited. The report is simultaneously displayed on the display screen 9 along with the floor plan generated by the BIM tool that illustrates the locations of all the devices, panels, circuit and panel assignments, and pathways. This simultaneous display feature provides immediate feedback to the system user as to the presence of any invalid pathways, or invalid circuits where no circuit has been assigned, thereby prompting the user to take immediate corrective actions.

Figure 4:
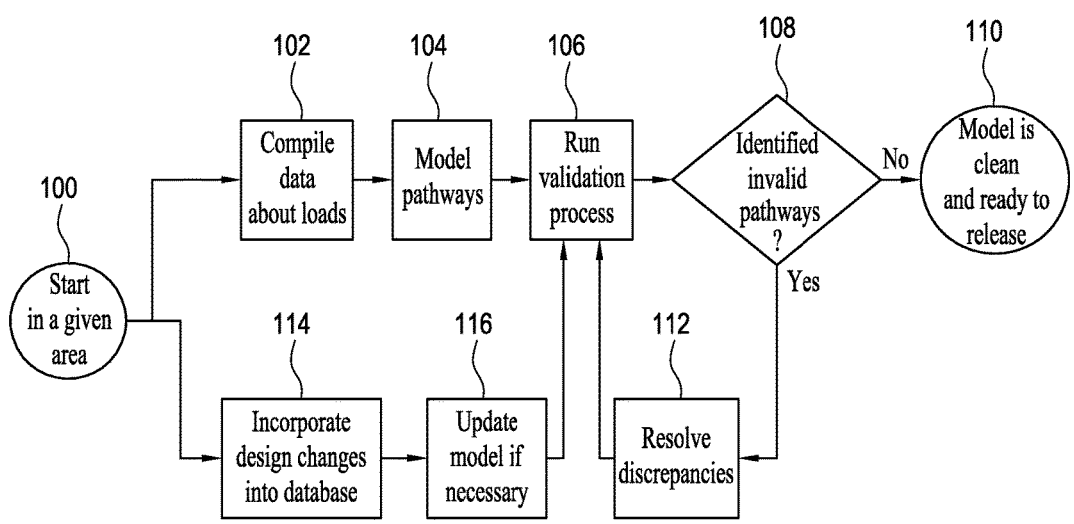
FIG. 4 is a flowchart illustrating the high-level application of the system to the different areas of a building and to changes made in the electrical and signal distribution system throughout the design and/or construction phase of the building.

FIG. 4 is a flowchart illustrating how the system 1 of the invention is applied to a building model and how the system 1 may accommodate changes in the electrical and signal distribution system throughout the design and/or construction phase of the building. In step 100, the operator of the system selects part of a building floor plan to apply the system to. While it may be possible to apply the system all at once to the entire floor plan of a small building, such an approach is often not practical for large buildings where the floor plan of a single level may include several hundred devices along with their respectively assigned panels and circuits. In such a case, the resulting small scale of the pathway elements carrying each of the circuits in combination with the large size and small print of the reports generated may make it difficult for the system user to efficiently apply the system. Accordingly, in many cases, the system operator divides up the floor plan into a number of contiguous sectors, each of which may have between 50 and 100 devices. Once such a floor plan sector has been chosen, the user applies the system 1 as indicated in boxes 102, 104, and 106 by compiling the x-y location data of the devices and their associated panels, the panel circuits assigned to the devices, the locations of the entry and exit points of the pathways carrying the circuits, and instructs the processor to run the validation process detailed in the flowchart of FIGS. 2A and 2B. In question block 108, the processor asks the question "Are There Any Invalid Pathways?" If "no", then the processor proceeds to block 110, and indicates on the display screen 9 the model is clean and ready to use. If however the answer to question block 108 is "yes", then the user proceeds to resolve the invalid pathways in the BIM model, whereupon the system 1 iteratively proceeds to the validation block 106 until all invalid pathways are resolved. Blocks 114 and 116 indicate that, whenever any design changes are made in the electrical distribution system in the floor plan sector being validated, the system 1 automatically updates the model in block 116, whereupon the system 1 iteratively proceeds to the validation block 106 until all invalid pathways are resolved.

FIGS. 5-9 illustrate an example of how the system 1 may be applied to an electrical power distribution system in a sector of a building floor plan designed by a BIM modeling tool.

Figure 5:
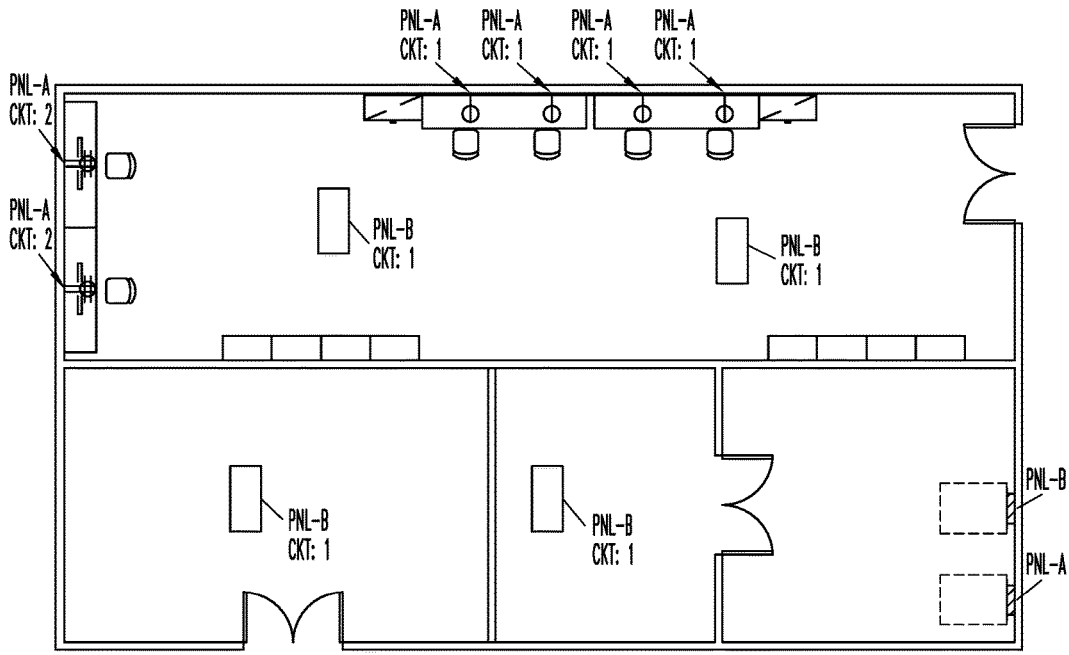
FIG. 5 illustrates how the display screen of the system simultaneously displays both an electrical power distribution system within a selected building floor plan sector designed by a BIM modeling tool, and the initial system report of the validity of electrical pathways between the devices and their respective panels generated by the digital processor after completing the steps of the flowchart of FIGS. 2A and 2B.

FIG. 5 illustrates a particular BIM-generated floor plan sector that the system user has chosen to display on the screen 9 of the system 1, along with the simultaneously displayed system report on the valid/invalid status of any pathways the BIM tool modeler may have provided. In actual use, the chosen floor plan sector would likely be much larger. However, for the sake of simplicity, a relatively small floor plan sector has been chosen. In this example, the electrical distribution system that the BIM modeler has provided in the floor pan sector includes ten electrical devices (i.e. two quadraplex receptacles, four single receptacles, and four 2'×4' recessed light fixtures) and two electrical supply panels (i.e. panel A and panel B). Additionally, the BIM modeler has assigned panel circuits to each of the devices. Specifically, both of the quadraplex receptacles have been assigned to panel A, circuit 2, all four of the single receptacles have been assigned to panel A, circuit 1, while all of the light fixtures have been assigned to panel B, circuit 1. While the BIM modeler in this example has not positioned any electrical pathway elements on the floor plan sector, the system 1 could also be applied to a floor plan sector that included some or all of the necessary pathway elements, whether provided by the BIM modeler or the system user. However, as there are no pathway elements assigned to any of the devices in this floor plan sector, the simultaneously-displayed system report generated via box 84 of the validation program indicates that there are no valid pathways in this floor plan sector. Specifically, both the leftmost "Device Connection Status" column and the rightmost "Panel Connection Status" columns are RED color-coded for each of the listed devices.

Figure 6:
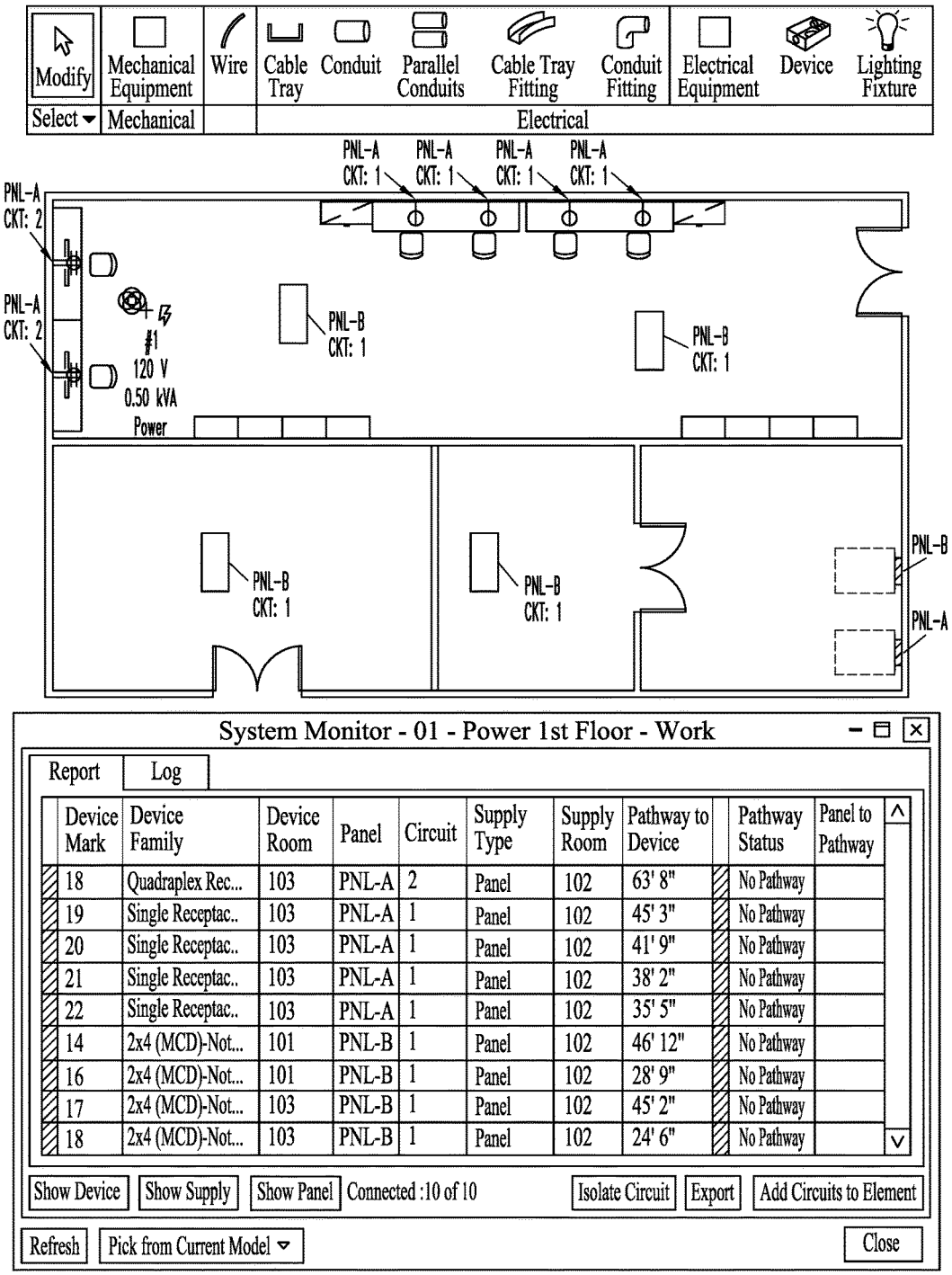
FIG. 6 illustrates how the display screen of the system appears after the system user begins to design an electrical wiring pathway in the electrical distribution system shown in FIG. 5 by positioning a junction box near two of the devices of the system.

FIG. 6 illustrates how the system user begins to design an electrical wiring pathway between the devices and their respective panels on the floor plan sector. Initially, the system user identifies devices assigned to the same circuit and places a pathway exit point element in close proximity to these groups of devices. Applying this principle to the present example, the system user notes that the two quadraplex receptacles shown on the left side of floor plan sector have both been assigned panel A, circuit 2. Accordingly, the system user displays the "electrical component" menu provided by the BIM tool, and proceeds to select a pathway exit point element, which in this example is a junction box. The system user positions the selected junction box between the two quadraplex receptacles as shown in FIG. 6 via a point-and-click operation from the user interface 7 of the processor 3.

Figure 7A:
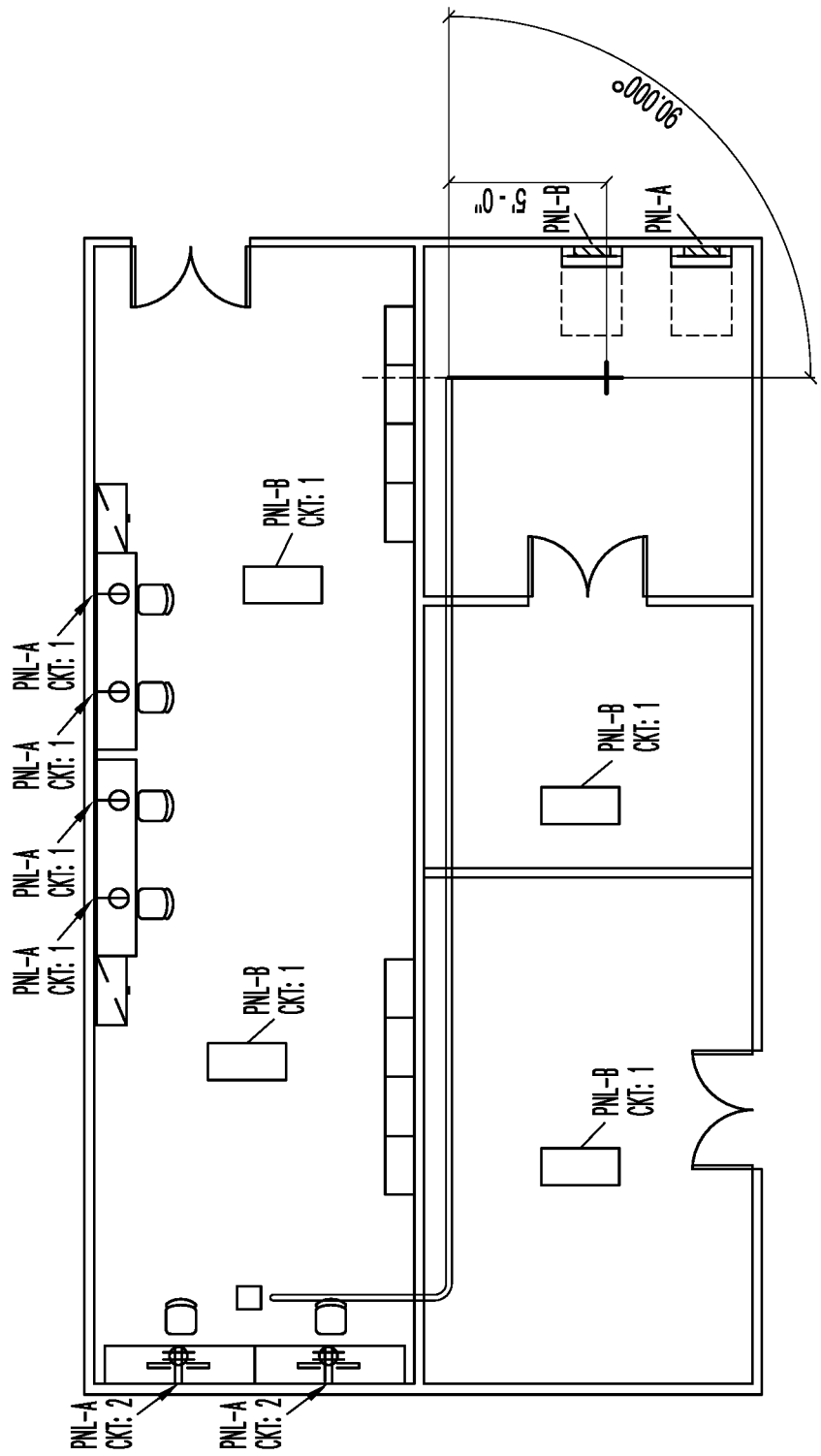
FIG. 7A illustrates how the system user continues to design an electrical wiring pathway in the electrical distribution system shown in FIG. 5 by positioning conduit between the junction box entered in FIG. 6 and the electrical panel assigned to the two devices.

FIG. 7A illustrates how the system user positions conduit back from the junction box to a location near panel A. The positioning of the conduit is based on industry best practices and the experience of the user. The chosen configuration of the conduit may be, for example, a compromise between the most direct (or shortest) path between the junction box and the panel, the presence of potential obstructions to the conduit, and the proximity of the conduit to other devices which are served by the same panel. In a preferred mode of operation, the system user manually assigns a circuit to the pathway elements after the user, in his or her judgment, has entered a string of elements that forms a complete pathway between the device and its associated source. Specifically, the system user manually assigns both the junction box positioned in the floor plan sector in FIG. 6, plus the run of conduit leading back from the junction box to near the panel A. Many commercially-available BIM tools allow the user to automatically associate each bend and straight piece of a conduit run with a particular circuit. Consequently, in this example, if the system user assigns the first length of conduit connected to the junction box to a particular circuit, each subsequent bend and straight piece of conduit is automatically assigned to this same circuit. Consequently, the entire conduit run illustrated in FIG. 7A can be treated as a single pathway element, and the system user need only manually assign two pathway elements to the circuit "PNL-A2". The manual configuration of the string of pathway elements, coupled with the manual assignment of at least the pathway elements providing the exit and entry points of the pathway, advantageously allows the validation program to provide consistent and accurate validation results. With respect to the pathway configuration, there are a number of considerations which must be taken into account by the user/designer in designing a valid pathway (e.g. the specific topology of the pathway elements, the assignment of multiple circuits to the same conduit runs without exceeding the standard fill ratio of the conduits, specific on-site restrictions and code requirements, etc.) that cannot be reliably decided solely on the basis of the positioning information provided by the BIM tool. The manual assignment of at least the exit and entry point elements of the pathway to the device and its associated circuit avoids errors that a completely automated system might commit that based its decisions solely on positional information.

Figure 7B:
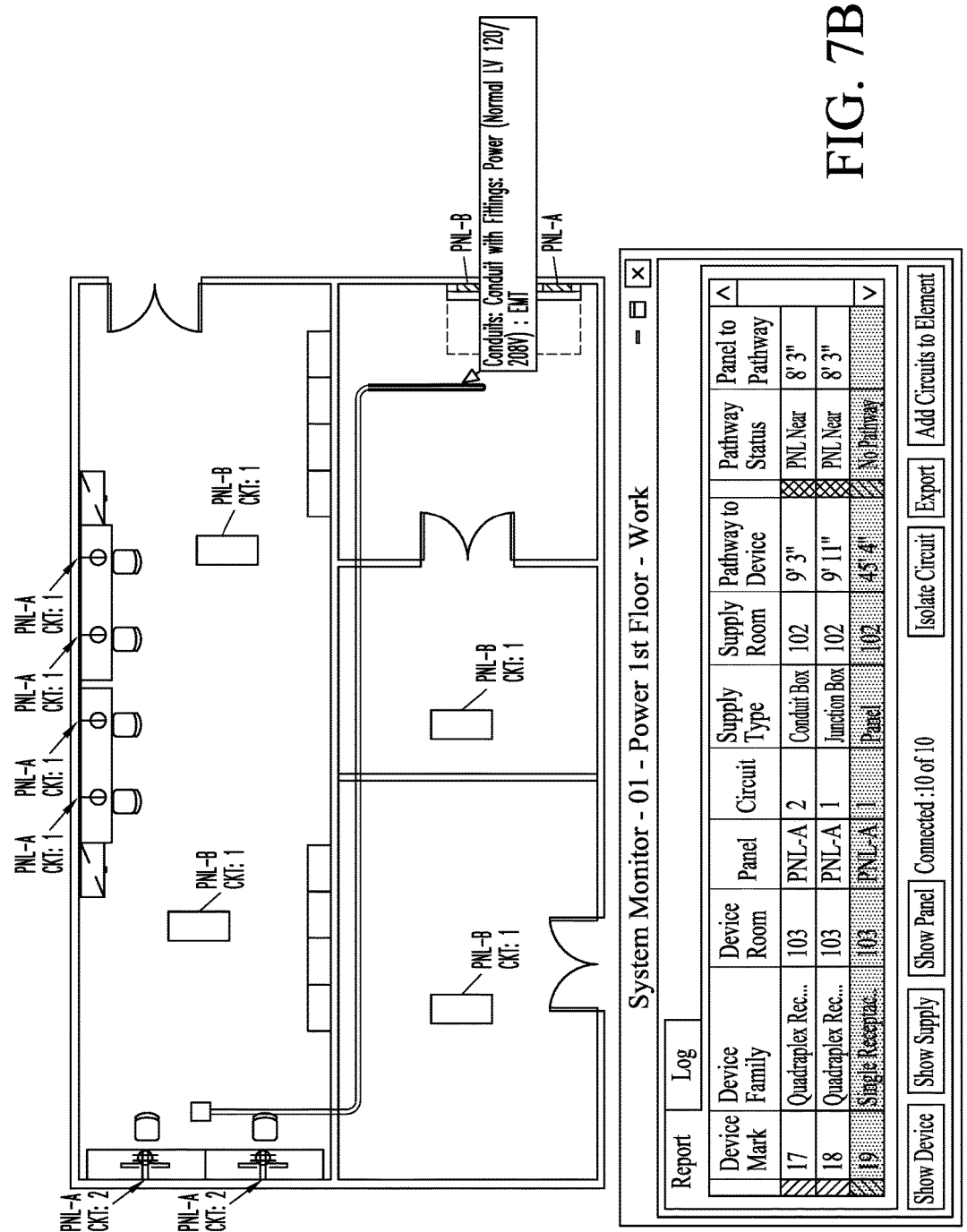
FIG. 7B illustrates the simultaneous display by the display screen of the system of both the pathway provided by the system user in FIG. 7A and the updated system report of the validity of electrical pathways between these devices and their respective panels.
Figure 7C:
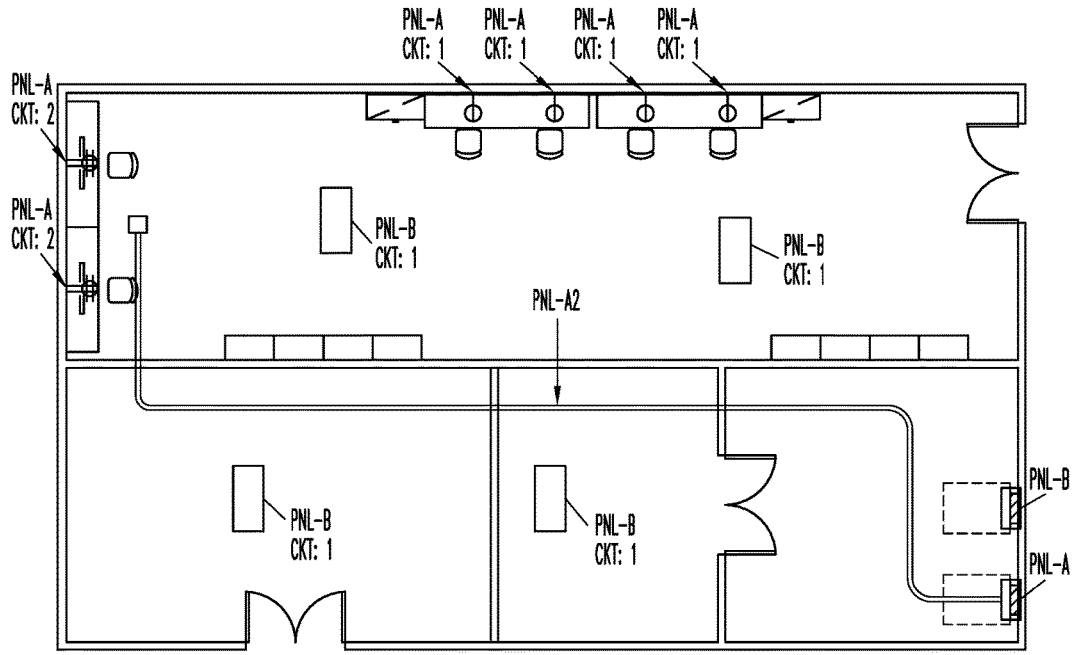
FIG. 7C illustrates the simultaneous display of an improvement to the pathway shown in FIG. 7A and the further updated system report of the validity of electrical pathways between the devices and their respective panels.

After the pathway illustrated in FIG. 7A has been laid out and the system user has assigned these pathway elements to the circuit "PNL-A2", the system 1 automatically actuates the processor 3 to re-run the validity program summarized in the flowchart of FIGS. 2A and 2B to update the validity report. The system program reflected in FIGS. 1A and 1B associates pathway elements with the circuit selected by the user, and uses this association to perform the validation. The result of this action is illustrated in FIG. 7B, wherein an updated validity report is simultaneously shown along with the floor plan sector on the display screen 9 of the processor 3. As the distance between the junction box of the pathway and the two quadraplex receptacles is less than ε2 (which is 20 feet in this embodiment of the invention) the updated "Device Connection Status" column on the leftward side of the report is color-coded GREEN for these two devices. However, as there is some distance between the entry point of the conduit and panel A, but the distance is less than ε1 (which is 10 feet in this embodiment) the "Panel Connection Status" column on the near the right side of the report is color coded YELLOW for these two devices. In response to the YELLOW color-coding of the "Panel Connection Status" column, the system user decides to directly connect the run of conduit to panel A as is shown in FIG. 7C, which in turn prompts the system 1 to rerun the validity program. Consequently, in the updated, simultaneously-displayed validity report, the color-coding of the "Panel Connection Status" system report changes from YELLOW to GREEN as there is "ZERO" distance between the panel and the pathway entry point.

FIG. 8 illustrates how the system user builds off of the pathway laid in FIG. 7C to provide a pathway to all of the remaining devices on the floor plan sector. However, upon the re-running the validation program through the processor 3, the resulting report continues to indicate that there are no valid pathways for the four light fixtures (each of which is indicated as a rectangle on the floor plan and as "2×4 (MCD)" in the report). The system user solves this problem by merely assigning the panel circuits (i.e. "panel B, circuit 1") to pathways already laid out in FIG. 9. This is possible due to the fact that a pathway formed from junction boxes and interconnected conduits is capable of carrying multiple circuits, as multiple wires may be carried by the same conduit. The result of such pathway assignment is shown in FIG. 9. Note how the circuit assignment of the conduits on the right side of the floor plan has changed from "Panel A, Circuits 1,2" to "Panel A, Circuits 1,2/Panel B, Circuit 1" After such a circuit assignment has been completed, the system automatically actuates the processor 3 to run the validity program, which results in the simultaneous display of the final validity report shown in FIG. 9 indicating, via all GREEN color-coding, that all pathways on the floor plan sector are valid. Thus the system 1 insures that every device has been assigned a circuit via question block 38 of the validation program, and further that every circuit has been assigned a valid wiring pathway.

The processor 3 automatically re-runs the validation program summarized in FIGS. 2A and 2B whenever (1) a circuit is assigned to a string of pathway elements; (2) a pathway element that has a circuit assigned is removed from the model; (3) a new device is entered into the BIM designed electrical distribution system, or (4) the location of a device is changed. Many BIM design tools generate a signal whenever some or all of the aforementioned changes to the design occur, and the implementation of such an automatic re-running of the validation program can take advantage of such a pre-existing property of the design tool to automatically update the pathway validation report concurrent with such design changes.

Figure 10B:
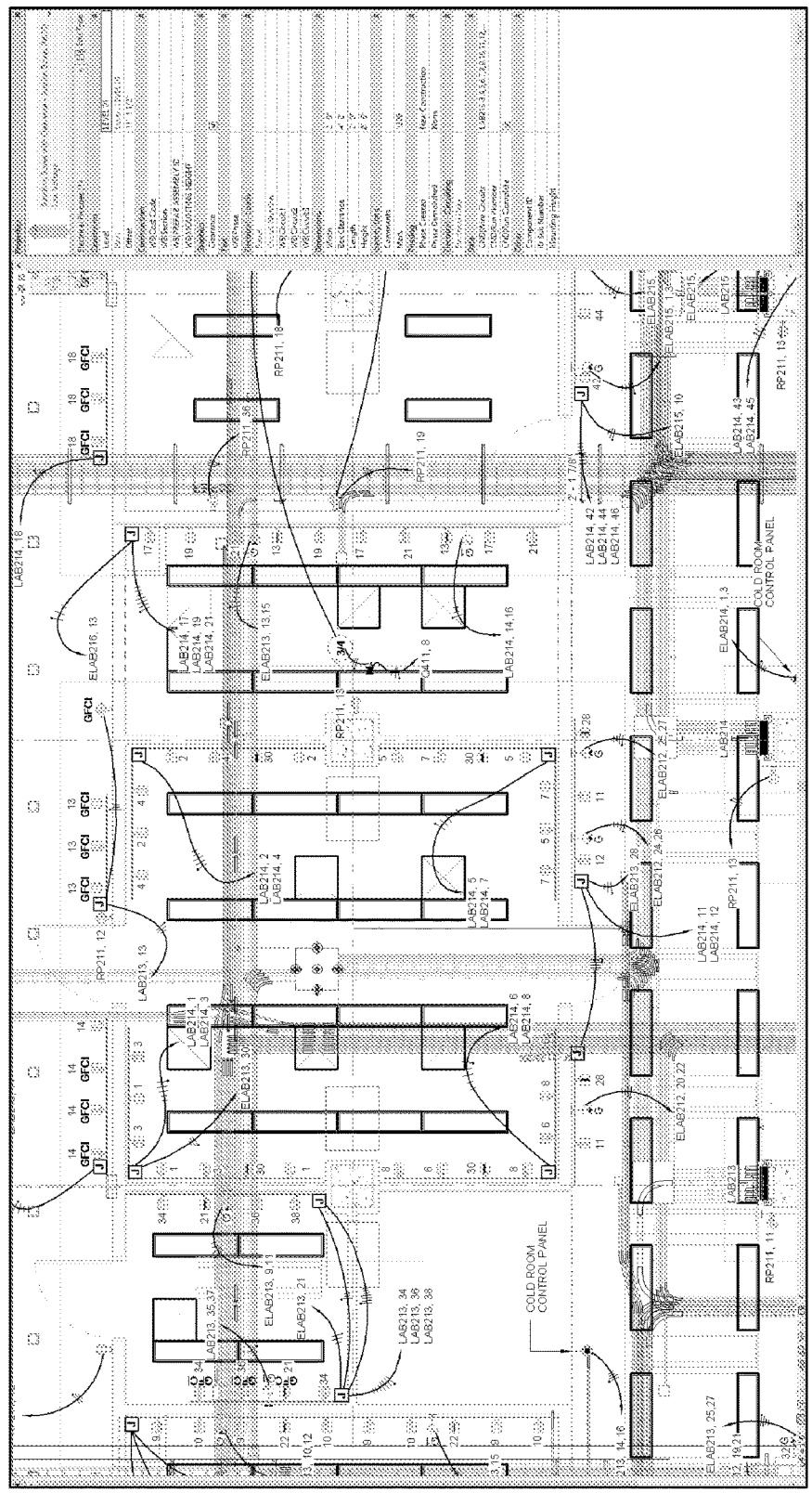
FIG. 10B is a screenshot of an actual floor plan sector being checked by the system, showing how the table of FIG. 10A is simultaneously displayed

FIGS. 10A and 10B illustrate how the system user may use the BIM tool to assign a circuit to a particular pathway element that can be read by the processor 3 when running the validation program illustrated in FIGS. 2A and 2B. The provision of such a table listing each of the pathway elements entered into the floor plan and providing a space for the user to assign a specific parameter such as a circuit number to the pathway element is a standard user interface component of most BIM or CAD tools. The BIM tool typically displays such a table simultaneously with the floor plan sector (as shown in FIG. 10B), and automatically updates the listed pathway elements in the table each time the user selects and enters a new pathway element on the floor plan. The upper portion of the table entitled "Properties" in FIG. 10B lists the physical properties of a selected conduit, i.e. the diameter, length and elevation above floor level. The information in this portion of the table is provided by the modeler who initially uses the BIM tool. It is the lower portion of the table entitled "Data" and best seen in FIG. 10A that is pertinent to the operation of the system 1. The "Data" section provides a space beside every pathway element for the system user to fill in a circuit number. This space is shown as "CND | Wire Circuits" in FIG. 10A, and is filled in as "PNL-A2" by the system user in the space to the right. The processor 3 of the system 1 reads this manually-entered association when running the validation program illustrated in FIGS. 2A and 2B. While the invention contemplates other ways of storing and retrieving the association between circuits and pathway elements, (e.g. an external database) the use of the BIM-provided "data" table is advantageously convenient both for the system user and for the validation system 1.

It should be noted that the floor plan sector illustrated in FIG. 10B is far more exemplary of an actual floor plan sector than the simplistic floor plan sectors illustrated in FIGS. 5-9. As is evident from the dense array of detail in FIG. 10B, oversights with respect to the validity (or even the existence) of pathways between the numerous devices and their respective panel circuits can easily occur if the user simply relies exclusively upon conventional BIM modeling tools. The proper application of the inventive system 1 to such BIM designed electrical distribution systems ensures that no such oversights occur, and that there will be a valid, cost-effective electrical wiring pathway between every device and its respective panel circuit.

Although the invention has been described in detail with particular reference to a preferred embodiment, it will be understood that variations and modifications can be effected within the spirit and scope of the invention. For example, the validation program reflected in FIGS. 2A and 2B can be modified so that the system user can reduce the number of pathway elements he must manually assign to a particular circuit at one time, thus saving the system user time and effort. In the previously-described example of the invention, only conduit runs formed from sections of conduit that are directly and serially connected can be entered as a single pathway element. If a conduit run includes a linking non-conduit component, such as a junction box that connects two different conduit sections, it cannot be entered as a single pathway element. Because the processor 3 can be programmed to recognize when adjacent pathway elements form a continuous pathway from the 3-dimensional positioning information extracted from the BIM tool, conduit runs including linking non-conduit members could be counted as a single pathway element. Of course, the x-y-z positional information of the pathway elements (as opposed to just the x-y information) would have to be initially extracted from the BIM tool in order to implement this particular variation of the invention. Other modifications, variations, and additions to the invention will become apparent to persons of skill in the art, and all such modifications, variations, and additions are intended to be within the scope of this invention, which is limited only by the claims appended hereto and their various equivalents.

The invention claimed is:

1. A testing system for verifying that a building information model-designed electrical distribution system in a building provides a valid wiring pathway between every device and a distribution source, wherein the building information model design provides a building floor plan having x-y-z locations of devices and distribution sources on the building floor plan, and an identity of a distribution source and an identity of a circuit assigned to each device, comprising:
   a digital processor having access to informational content of the building information model-designed electrical distribution system, and
   a user interface operatively connected to the digital processor, and a visual display screen operatively connected to the digital processor,
   wherein the digital processor executes the steps of:
   (a) extracting from the building information model-designed electrical distribution system the location of the devices and the distribution sources and any wiring pathway elements included within the building information model-designed electrical distribution system;
   (b) determining the identity of wiring pathway elements that form at least a partial wiring pathway for each circuit, and identifying exit points and entry points of each wiring pathway;
   (c) selecting, for each device, a closest exit point of the wiring pathway associated with the device's assigned circuit;
   (d) selecting a closest entry point of the associated wiring pathway with respect to the distribution source of the assigned circuit by tracing backwards from the selected closest exit point along the identified wiring pathway elements, and
   (e) informing a user, via the visual display screen, whether a distance between the device and the nearest exit point and a distance between the distribution source and the nearest entry point exceed pre-selected tolerances indicative of a valid wiring pathway,
   wherein the wiring pathway elements include wires and protective components covering the wires, and
   wherein the exit points of the wiring pathway are points where the wires are accessible from the protective components.

2. The testing system defined in claim 1, wherein the digital processor further executes the steps of: informing the user via the visual display screen if a distance between the device and the closest exit point of the associated wiring pathway is greater than or equal to a preselected distance $\varepsilon 2$, wherein distances greater than or equal to $\varepsilon 2$ indicate an invalid wiring pathway between the device and its assigned distribution source circuit, and informing the user via the display screen if the distance between the distribution source associated with the device and the closest entry point of the wiring pathway is greater than or greater than a preselected distance $\varepsilon 1$, wherein distances greater than or equal to $\varepsilon 1$ indicate that there is an invalid wiring pathway between the device and its assigned distribution source, wherein $\varepsilon 2$ is substantially greater than $\varepsilon 1$.

3. The testing system defined in claim 2, wherein the value of $\varepsilon 2$ is about twice as much as the value of $\varepsilon 1$.

4. The testing system defined in claim 2, wherein the value of $\varepsilon 1$ is about 10 feet, and the value of $\varepsilon 2$ is about 20 feet.

5. The testing system defined in claim 1, wherein the digital processor further executes the step of confirming whether the building information model-designed electrical distribution system has assigned each device to a circuit of one of the distribution sources, and for any such unassigned device, informing the user of the testing system via the display screen of the unassigned condition of the device.

6. The testing system defined in claim 1, wherein the digital processor further executes the step of determining, for each device for which the building information model-designed electrical distribution system has assigned a circuit, whether there is a wiring pathway exit point element associated with the circuit assigned to the device, and if not, if the distance between the device and its assigned distribution source is greater than or equal to a preselected distance $\varepsilon 2$, then informing the user via the display screen that no valid wiring pathway exists between the device and its assigned distribution source.

7. The testing system defined in claim 1, wherein the protective components of the wiring pathway elements include an electrical conduit, a junction box, and a pull box.

8. The testing system defined in claim 1, wherein the processor informs the user, via the display screen, whether the distances between the device and the nearest exit point and the distribution source and the nearest entry point exceed pre-selected tolerances indicative of a valid wiring pathway simultaneously with the positioning of wiring pathway elements by the system user into the building information model-designed electrical distribution system.

9. The testing system defined in claim 1, wherein the digital processor determines the closest entry point of the wiring pathway by determining the distance between each entry point of each pathway element and the distribution source associated with the device, and then selecting the closest entry point to the distribution source.

10. A testing system for verifying that a building information model-designed electrical distribution system in a building provides a valid wiring pathway between every device and a distribution source, wherein the building information model provides a building floor plan, x-y-z locations of the devices and distribution sources on the building floor plan, and an identity of both a distribution source and a circuit assigned to each device, comprising:
- a digital processor having access to informational content of the building information model-designed electrical distribution system, and
- a user interface operatively connected to the digital processor, and a display screen operatively connected to the digital processor, wherein the digital processor executes the steps of:
- (a) extracting from the building information model-designed electrical distribution system the location of the devices and the distribution sources and any wiring pathway elements included within the building information model-designed electrical distribution system or added thereafter;
- (b) determining the identity of wiring pathway elements that form a wiring pathway for each distribution source circuit assigned to each device, and identifying the exit points and entry points of each wiring pathway;
- (c) determining the locations of the exit points and entry points of each wiring pathway;
- (d) selecting, for each device, a closest exit point for the wiring pathway associated with the device's assigned circuit;
- (e) selecting a nearest entry point of the wiring pathway associated with the device's assigned circuit to the distribution source associated with the assigned circuit by tracing backwards from the closest exit point of the identified wiring pathway elements to the last pathway element forming the wiring pathway, and
- (f) informing a user, via the display screen, whether the distance between the device and the nearest exit point is within a pre-selected distance $\varepsilon 2$ and the distance between the associated distribution source and the nearest entry point is within a pre-selected distance $\varepsilon 1$ simultaneously with the positioning of pathway elements by the user into the building information model-designed electrical and signal distribution system, wherein distances less than $\varepsilon 1$ and $\varepsilon 2$ are indicative of a valid wiring pathway, wherein the wiring pathway elements include wires and protective components surrounding the wires, and wherein the exit points of the wiring pathway are points where the wires are accessible from the protective components.

11. The testing system defined in claim 10, wherein the digital processor further executes the step of confirming whether the building information model-designed electrical distribution system has assigned each device to a circuit of one of the distribution sources, and for any such unassigned device, informing the user of the testing system via the display screen of the unassigned condition of the device.

12. The testing system defined in claim 10, wherein the protective components of the wiring pathway elements include one or more of an electrical conduit, a junction box, and a pull box.

13. The testing system defined in claim 10, wherein the digital processor further executes the step of determining, for each device for which the building information model-designed electrical distribution system has assigned a circuit, whether there is a pathway exit point element associated with the circuit assigned to the device, and if not, if the distance between the device and its assigned distribution source is greater than or equal to a preselected distance $\varepsilon 2$, then informing the user via the display screen that no valid pathway exists between the device and its assigned distribution source.

14. The testing system defined in claim 10, wherein the digital processor determines the closest entry point of the pathway by determining the distance between each entry point of each pathway element and the distribution source associated with the device, and then selecting the closest entry point to the distribution source.

15. A testing method for verifying that a building information model-designed electrical distribution system in a building provides a valid wiring pathway between every device and a distribution source, wherein the building information model-designed system includes a building floor plan having x-y-z locations of devices, distribution sources on the building floor plan, and an identity of both a distribution source and a circuit assigned to each device, wherein the building information model-designed electrical distribution system is shown on a display screen of a digital processor having a user interface, comprising the steps of:
- extracting from the building information model-designed electrical distribution system a location of the devices and their associated distribution sources;
- determining the identity of wiring pathway elements that form at least a partial wiring pathway for the circuit assigned to each device, and the location of exit points and entry points of each wiring pathway;
- selecting, for each device and its assigned source, a closest exit point to the device on its associated wiring pathway, and
- selecting, for each device, a closest entry point to the distribution source of the wiring pathway associated with the device by tracing backwards from the closest exit point elements to the last pathway element forming the associated wiring pathway, and
- displaying on the display screen whether the distances between the device and the nearest exit point and the distribution source and the nearest entry point are within pre-selected distance tolerances $\varepsilon 2$ and $\varepsilon 1$, respectively, indicative of a valid wiring pathway wherein the wiring pathway elements include wires and protective components surrounding the wires, and wherein the exit points of the wiring pathway are points where the wires are accessible from the protective components.

16. The testing method defined in claim 15, further comprising the step of:
- determining, for each device for which the building information model-designed electrical distribution system has assigned a circuit, whether there is a pathway exit element associated with the circuit assigned to the device, and if not, determining if the distance between the device and its assigned distribution source is greater than or equal to the preselected distance $\varepsilon 2$, wherein distances greater than $\varepsilon 2$ indicate that no valid pathway exists between the device and its assigned distribution source.

17. The testing method defined in claim 15, further comprising the step of:

confirming whether the building information model-designed electrical distribution system has assigned each device to a circuit of one of the distribution sources, and for any such unassigned device, informing the user of the testing system via the display screen of the unassigned condition of the device.

18. The testing method defined in claim 15, wherein the system user manually positions on the display screen at least exit and entry points of a pathway formed from a string of pathway elements, and the display screen simultaneously displays a validation report on all pathways present in the building information model-designed electrical distribution system.

\* \* \* \* \*